(12) United States Patent
Kusner

(10) Patent No.: US 9,151,849 B2
(45) Date of Patent: Oct. 6, 2015

(54) OPTICAL FIBER HAVING SCINTILLATION QUENCHER, A RADIATION SENSOR AND A RADIATION DETECTION APPARATUS INCLUDING THE OPTICAL FIBER AND A METHOD OF MAKING AND USING THE SAME

(71) Applicant: Saint-Gobain Ceramics & Plastics, Inc., Worcester, MA (US)

(72) Inventor: Michael R. Kusner, Auburn Township, OH (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 14/264,178

(22) Filed: Apr. 29, 2014

(65) Prior Publication Data

US 2014/0231656 A1     Aug. 21, 2014

Related U.S. Application Data

(63) Continuation of application No. 13/536,744, filed on Jun. 28, 2012, now Pat. No. 8,748,824.

(60) Provisional application No. 61/503,239, filed on Jun. 30, 2011.

(51) Int. Cl.
*G01T 1/10* (2006.01)
*G01T 1/20* (2006.01)
(Continued)

(52) U.S. Cl.
CPC ............ *G01T 1/2002* (2013.01); *G01T 1/2006* (2013.01); *G01T 3/06* (2013.01); *G02B 6/02033* (2013.01); *G02B 2006/12126* (2013.01); *G02B 2006/12138* (2013.01)

(58) Field of Classification Search
CPC ........................................................ G02B 1/04
USPC ........................................................ 250/362
See application file for complete search history.

(56) References Cited

U.S. PATENT DOCUMENTS

| 3,886,082 A | 5/1975 | Hyman, Jr. |
| 4,002,901 A | 1/1977 | Coffin |

(Continued)

FOREIGN PATENT DOCUMENTS

| EP | 0899588 A2 | 3/1999 |
| GB | 1355815 A | 6/1974 |

(Continued)

OTHER PUBLICATIONS

J.C. Cheng et al., "Response of Ultrafast Scintillators," Lawrence Livermore Laboratory, American Physical Society, 1976 Annual Meeting of the Division of Plasma Physics, dated Nov. 15-19, 1976, 21 pages.

(Continued)

*Primary Examiner* — Kiho Kim
(74) *Attorney, Agent, or Firm* — Abel Law Group, LLP; Robert N Young

(57) ABSTRACT

An optical fiber can include a polymer and a scintillation quencher. The optical fiber can be a member of a radiation sensor or radiation detecting system. The scintillation quencher can include a UV-absorber or a scintillation resistant material. In one embodiment, the radiation sensor includes a scintillator that is capable of generating a first radiation having a wavelength of at least about 420 nm; and a scintillation quencher is capable of absorbing a second radiation having a wavelength of less than about 420 nm. The optical fiber including a scintillation quencher provides for a method to detect neutrons in a radiation detecting system.

20 Claims, 3 Drawing Sheets

(51) Int. Cl.
*G01T 3/06* (2006.01)
*G02B 6/02* (2006.01)
*G02B 6/12* (2006.01)

(56) References Cited

U.S. PATENT DOCUMENTS

| | | | |
|---|---|---|---|
| 4,807,964 A * | 2/1989 | Sare | 385/143 |
| 5,087,818 A | 2/1992 | Bellian et al. | |
| H001364 H | 10/1994 | Toeppen | |
| 5,519,226 A * | 5/1996 | Copeland et al. | 250/390.11 |
| 6,078,052 A | 6/2000 | DiFilippo | |
| 6,314,224 B1 * | 11/2001 | Stevens et al. | 385/113 |
| 6,333,503 B1 | 12/2001 | Chapuis et al. | |
| 6,892,011 B2 | 5/2005 | Walker et al. | |
| 6,909,097 B2 | 6/2005 | Schreiner et al. | |
| 6,909,098 B2 | 6/2005 | Bross et al. | |
| 7,683,335 B2 | 3/2010 | Treadwell et al. | |
| 2002/0168157 A1 | 11/2002 | Walker et al. | |
| 2003/0034455 A1 | 2/2003 | Schreiner et al. | |
| 2003/0059188 A1 * | 3/2003 | Baker et al. | 385/128 |
| 2005/0208290 A1 | 9/2005 | Patel | |
| 2005/0288438 A1 * | 12/2005 | Nandi | 525/110 |
| 2009/0014662 A1 | 1/2009 | Suhami | |
| 2009/0014665 A1 | 1/2009 | Fleming et al. | |
| 2009/0283687 A1 | 11/2009 | Menge et al. | |
| 2010/0172477 A1 | 7/2010 | Kusner et al. | |
| 2010/0213390 A1 | 8/2010 | Safai | |
| 2011/0079726 A1 | 4/2011 | Kusner et al. | |
| 2011/0089332 A1 | 4/2011 | Ivan et al. | |

FOREIGN PATENT DOCUMENTS

| | | |
|---|---|---|
| GB | 2077907 A | 12/1981 |
| JP | 2009258119 A | 11/2009 |
| WO | 2010141125 A2 | 12/2010 |
| WO | 2013003621 A2 | 1/2013 |

OTHER PUBLICATIONS

K.Z. et al., "Cerencov Light Absorption by a UV-Absorber in Calorimeter Wavelength Shifter Plates," PP note 106, dated Jun. 27, 1980, 5 pages.

"Neutron-Gamma Discrimination with Stilbene and Liquid Scintillators," PerkinElmer Instruments—ORTEC, <www.ortec-online.com>, downloaded Feb. 18, 2013, 4 pages.

M. David et al., "Comparative Measurements of WLS Fibers," TILE-CAL note No. 034, dated Nov. 28, 1994, 34 pages.

International Search Report for PCT/US2012/044697 dated Dec. 18, 2012, 6 pages.

Guo, Zhen-yu et al., "Advances in Research on Benzophenones UV Absorber," Plastic Additives, No. 5, total No. 65, dated 2007, pp. 8-11 (English Abstract).

* cited by examiner

OPTICAL FIBER HAVING SCINTILLATION QUENCHER, A RADIATION SENSOR AND A RADIATION DETECTION APPARATUS INCLUDING THE OPTICAL FIBER AND A METHOD OF MAKING AND USING THE SAME

CROSS-REFERENCE TO RELATED APPLICATION

This application is a continuation of and claims priority under 35 U.S.C. §120 to U.S. patent application Ser. No. 13/536,744, filed Jun. 28, 2012, entitled "Optical Fiber having Scintillation Quencher, a Radiation Sensor and a Radiation Detection Apparatus including the Optical Fiber and a Method of Making and Using the Same," by Michael R. Kusner, which claims priority under 35 U.S.C. §119(e) to U.S. Provisional Patent Application No. 61/503,239 entitled "Optical Fiber having Scintillation Quencher, a Radiation Sensor and a Radiation Detection Apparatus including the Optical Fiber and a Method of Making and Using the Same," by Michael R. Kusner, filed Jun. 30, 2011, which is assigned to the current assignee hereof and incorporated herein by reference in its entirety.

FIELD OF THE DISCLOSURE

The present disclosure is directed to optical fibers, radiation sensors and radiation detection apparatuses and methods of using the same, and more particularly to optical fibers, radiation sensors and radiation detection apparatuses including the optical fibers, and methods of making and using the foregoing.

BACKGROUND

A radiation detector can include a plastic scintillator, such as alternating layers of wavelength shifting fibers and phosphorescent materials. The layers of phosphorescent material can be BC-704™-brand neutron sensing phosphorescent layers available from Saint-Gobain Crystals of Hiram, Ohio, USA. Conventional neutron detection using solid-state scintillators typically rely on the optical coupling of a neutron-sensing scintillator material composite to a flat window of a photosensor. The industry demands further improvements of neutron detection in view of these detriments.

BRIEF DESCRIPTION OF THE DRAWINGS

Embodiments are illustrated by way of example and are not limited in the accompanying figures.

Figure 1:
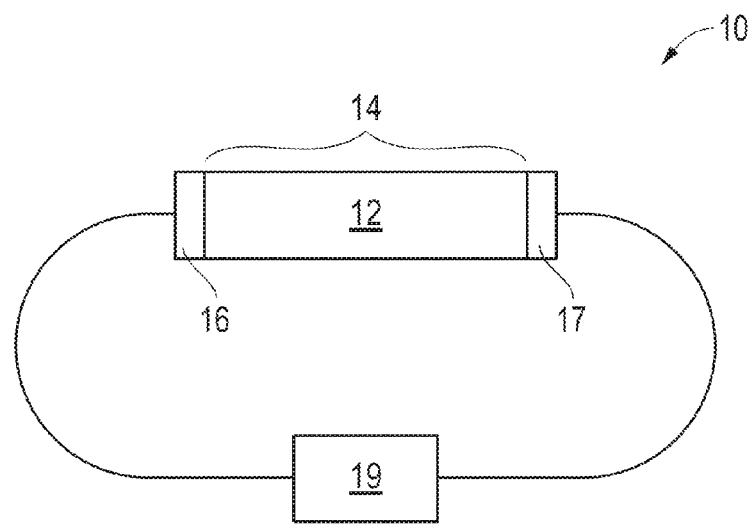
FIG. 1 includes a schematic depiction of a radiation detection apparatus in accordance with an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

The term "corresponding radiation detecting system" is intended to mean a radiation detecting system that is substantially identical and used under substantially the same conditions as a radiation detecting system with a scintillation quencher, except that the corresponding radiation detecting system does not have the scintillation quencher within a medium used to transmit scintillation light through at least a portion of a radiation sensor towards a photosensor. For example, the radiation detecting system with the scintillation quencher and the corresponding radiation detecting system may have substantially the same composition, thickness, and number of phosphor layers, and have substantially the optical media, including substantially the same form (for example, optical fibers, an optical transmission sheet, or the like), number of optical media layers, and, except for the scintillation quencher, substantially the same composition.

The terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

Optical fibers as used in some radiation sensors or radiation detecting systems can include a material that quenches undesired scintillation. Such a material can significantly reduce the likelihood of undesired scintillation from particular materials or at particular wavelengths. Alternatively, such a material can quench undesired scintillation by absorbing undesired scintillation radiation that is generated in the optical fiber. The material is chosen to quench undesired scintillation without affecting any desired radiation that is transmitted along the optical fiber.

FIG. 1 includes an illustration of an embodiment of a radiation detection apparatus 10. In the embodiment illustrated, the radiation detection apparatus 10 includes a radiation sensor 12 and photosensors 16 and 17 that are optically coupled to the radiation sensor 12, which has a corresponding radiation sensing region 14. The radiation sensor 12 can have many different shapes. Each or both of the photosensors 16 and 17 can be in the form of a photomultiplier tube (PMT), a semiconductor-based photomultiplier, an avalanche photodiode, or a hybrid photosensor. The photosensors 16 and 17 can receive light from the optical fibers in radiation sensor 12 and generate electrical pulses based on the numbers of photons that they receive. The photosensors 16 and 17 are electrically coupled to an electronics module 19. The electrical pulses can be shaped, digitized, analyzed, or any combination thereof by the electronics module 19 to provide information regarding the amount of light received from either or both of the photosensors 16 and 17 or other information. The electronics module 19 can include an amplifier, a discriminator, an analog-to-digital signal converter, a photon counter, another electronic component, or any combination thereof. In an alternative embodiment (not illustrated), one of the photosensors 16 or 17 may be replaced by a reflector. Only one photosensor may be used with a reflector in place of the photosensor on the other side of the detector. Analysis may also incorporate one or more signal analysis algorithms in an application-specific integrated circuit ("ASIC"), a field-programmable gate array ("FPGA"), or another similar device.

Figure 2:
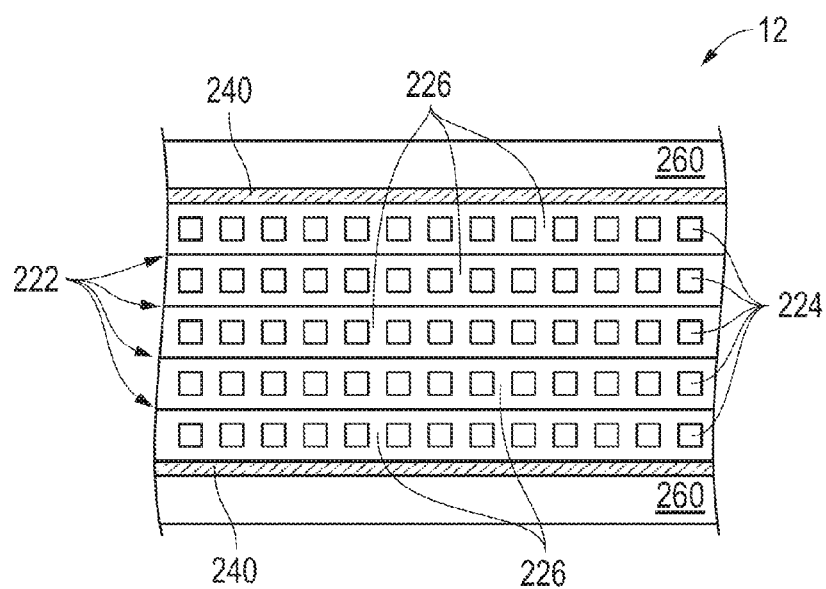
FIG. 2 includes an illustration of a cross-sectional view of a portion of a radiation sensor.

FIG. 2 includes a cross-sectional view of a radiation sensor 10 that includes layers of phosphorescent material 222. In an embodiment, the material can include $^6$Li or $^{10}$B. In a particular embodiment, the material can include $^6$LiF. Another material can be capable of generating scintillating light. The other material can include a ZnS, a $CdWO_4$, a $Y_2SiO_5$, a ZnO, a ZnCdS, or any combination thereof. In another embodiment, the other material can include silver doped ZnS (ZnS:Ag) or copper doped ZnS (ZnS:Cu). In a particular embodiment, the material can include ZnS:Ag, ZnS:Cu, ZnS:Ti, $Y_2SiO_5$:Ce, ZnO:Ga, ZnCdS:Cu, or any combination thereof.

Scintillating light from the phosphorescent material 222 passes through a clear material 226 and is received by optical fibers 224. The clear material can be a polymer. In one embodiment, the clear material can be an epoxy polymer. The optical fibers can have a rectangular cross section as shown by element 224 in FIG. 2. In other embodiments the cross section of the wavelength shifting fibers can be circular, oval, or ellipsoidal. The optical fibers transmit scintillating light or derivatives of a scintillating light (not illustrated in FIG. 2). A derivative of the scintillating light from the scintillator can be light that is emitted from a wavelength shifting element, such an optical fiber containing a wavelength shifting material or member. In an embodiment, the derivative of the scintillating light has a wavelength greater than the wavelength of the scintillating light.

A reflector 240 surrounds the combination of the phosphorescent material 222, the optical fibers 224, and the clear material 226 as illustrated in FIG. 2 to increase the amount of scintillating light received by the optical fibers 224. In one embodiment, the scintillating light is shifted to light of a longer wavelength and transmitted to a photosensor (not illustrated in FIG. 2) that converts light received by the photosensor to an electronic signal. Further illustrated in FIG. 2 is a neutron moderator 260 that converts fast neutrons to thermal neutrons to increase the likelihood of capture of a neutron by the phosphorescent material 222. The radiation sensor 12 can be in the form of a rectangle, or any other suitable shape. The optical fibers can also include a wavelength-shifting material.

In an embodiment, the optical fiber can shift the wavelength of scintillating light to a longer wavelength. For example, the optical fiber may shift the wavelength to blue light or green light In an embodiment, optical fibers in a radiation sensor can be held together by a binder. In another embodiment, the optical fibers can be held together mechanically. The optical fibers may be arranged in an array of rows and columns or an irregular pattern, for example, not an array of rows and columns. The optical fibers can be in the form of a closely packed bundle, wherein a majority of the optical fibers 224 contact at least three other fibers. The space between fibers can be occupied at least part with a binder.

The optical fibers can include optical cores and some or all of the optical cores may be surrounded by a cladding or other coating having a different refractive index as compared to the optical core, wherein such cladding or other coating can improve signal transmission. The optical cores can include a polymer. The polymer can include a polyacrylate, such as polymethylmethacrylate ("PMMA"); a polystyrene; a polyvinyltoluene; or another suitable light-transmitting polymer. In a particular embodiment, the optical core includes polystyrene. In yet another particular embodiment, the optical core is substantially free of polyacrylate. In another embodiment, a layer including PMMA can surround an optical core that includes polystyrene.

In one embodiment, the optical fiber includes a scintillation quencher. A scintillation quencher can include a material that inhibits scintillation by absorbing radiation or particles that cause scintillation in a material. In an embodiment, gamma rays or secondary particles can transmit along the optical fiber that contains a scintillation quencher in form of a scintillation resistant material. The scintillation resistant material can be a material such as a polymer that includes moieties capable of substantially preventing undesired scintillation. Alternatively or in combination with the scintillation resistant material, the scintillation quencher can include a material that inhibits scintillation by absorbing radiation created by undesired scintillation. The undesired scintillation can originated from scintillation-causing radiation, such as gamma rays or secondary particles. When such radiation is absorbed by a material in an optical fiber, it may generate UV-radiation that can be absorbed by UV-absorbers that serve as scintillation quencher without significantly interfering with the scintillating light from a radiation detector.

Some particular types of neutron detectors generate secondary particles, such as secondary particle electrons that can interfere with the detection of neutron. Secondary particle electrons are particles generated as ionization products. They are called "secondary" because they are generated by other radiation (the primary radiation). This primary radiation can be in the form of ions, electrons, or photons with sufficiently high energy that exceeds the ionization potential of an atom or molecule that absorbs the primary radiation. The secondary particles can cause undesired scintillation when absorbed by the material in the optical fiber. Moreover, secondary electrons can generate Cherenkov radiation.

Cherenkov radiation is electromagnetic radiation emitted when a charged particle, such as an electron, passes through a dielectric medium at a speed greater than the phase velocity of light in that medium. The charged particles can polarize the molecules of that medium, which then turn back rapidly to their ground state, emitting radiation in the process. The characteristic blue glow of nuclear reactors is due to Cherenkov radiation.

In one embodiment, a scintillation quencher can absorb gamma radiation, secondary particles, or Cherenkov radiation. This material does not significantly interfere with the scintillation radiation generated when capturing a neuron within the neutron detector.

The electromagnetic spectrum of ultraviolet light can be subdivided in a number of ways. Ultraviolet A ("UVA") ranges from 400 nm to 315 nm; Ultraviolet B ("UVB") ranges from 315 nm to 280 nm; and Ultraviolet C ("UVC") ranges from 280 nm to 100 nm. Another description of the UV spectrum includes Near UV ranging from 400 nm to 300 nm, Middle UV ranging from 300 nm to 200 nm, Far UV ranging 200 nm to 122 nm, Vacuum UV 200 nm to 100 nm, Low UV ranging from 100 nm to 88 nm, or Super UV ranging from 150 nm to 10 nm.

Scintillation quenchers include materials that absorb partially or completely UV radiation. Scintillation quenchers can be UVA absorbers, UVB absorbers, or both. In one embodiment, a UV absorber is an aromatic compound. In another embodiment, a UV absorber can include a ketone or ester moiety. In one embodiment, a UV absorber is non-fluorescent or do not fluoresce at wavelengths within 25 nm of the wavelength corresponding to the emission maximum of the scintillating light from the scintillator or a derivative thereof (for example, wavelength shifted light).

In an embodiment, the UV absorber is benzophenone or a benzophenone-like compound, such as 2,4-dihydroxybenzophenone, 2,2',4,4'-tetrahydroxybenzophenone, 2-hydroxy-4-methoxybenzophenone, 2,2'-dihydroxy-4,4'-dimethoxybenzophenone, 5-chloro-2-hydroxybenzophenone, and 2,2'-dihydroxy-4-methoxybenzophenone.

In another embodiment, the UV absorber can be naphthalene or a naphthalene-like compound. In yet another embodiment, the UV absorber can be dibenzoylmethane or a dibenzoylmethane-like compound. Alternatively, the UV absorber may have the chemical structure of, or be a compound similar to bis-ethylhexyloxyphenol methoxyphenyl triazine, butyl methoxydibenzoylmethane; diethylamino hydroxybenzoyl hexyl benzoate, methylene bis-benzotriazolyl tetramethylbutylphenol, methyl anthranilate, ethylhexyl methoxycinnamate, ethylhexyl salicylate, ethylhexyl triazone, ethylhexyl dimethyl benzoic acid, homomethyl salicylate, is amyl p-methoxycinnamate, octocrylene; butyloctyl salicylate, diethylhexyl 2,6-naphthalate, or diethylhexyl syringylidene malamute. In yet another embodiment, the scintillation quencher is substantially free of nitrogen.

In yet another embodiment, the UV absorber includes a mixture of UV absorbing compounds. In one particular embodiment, the UV absorber absorbs light at wavelength less than 420 nm. In another particular embodiment, the UV absorber absorbs Cherenkov light.

In another embodiment, the scintillation quencher can include a scintillation resistant material. The scintillation resistant material can be a polymer including a UV absorber. The UV absorber can be incorporated into the polymer matrix. The UV absorber can be covalently bonded to the matrix. For example, the UV absorber can include a monomer having a UV-absorbing moiety which will be incorporated into the polymeric chain upon curing or polymerization. Such monomeric UV-absorbing units can be derivatives of aromatic ketones, such as benzophenones or dibenzoylmethanes, which contain an additional vinyl group as a chain-forming unit upon curing or polymerization.

In embodiments, the scintillation quencher is present in the optical fiber in an amount of at least about 50 ppm by weight, at least about 129 ppm by weight, at least about 0.01% by weight, at least about 0.05% by weight, at least about 0.5% by weight, or even at least about 1.0% by weight. In other embodiments, the scintillation quencher is in amounts not greater than about 10.0% by weight, or not greater than about 5.0% by weight, such as not greater than about 3.0% by weight, not greater than about 0.9% by weight, or not greater than 0.1% by weight. Further, in other embodiments, the optical fiber includes a wavelength-shifting material.

Figure 4:
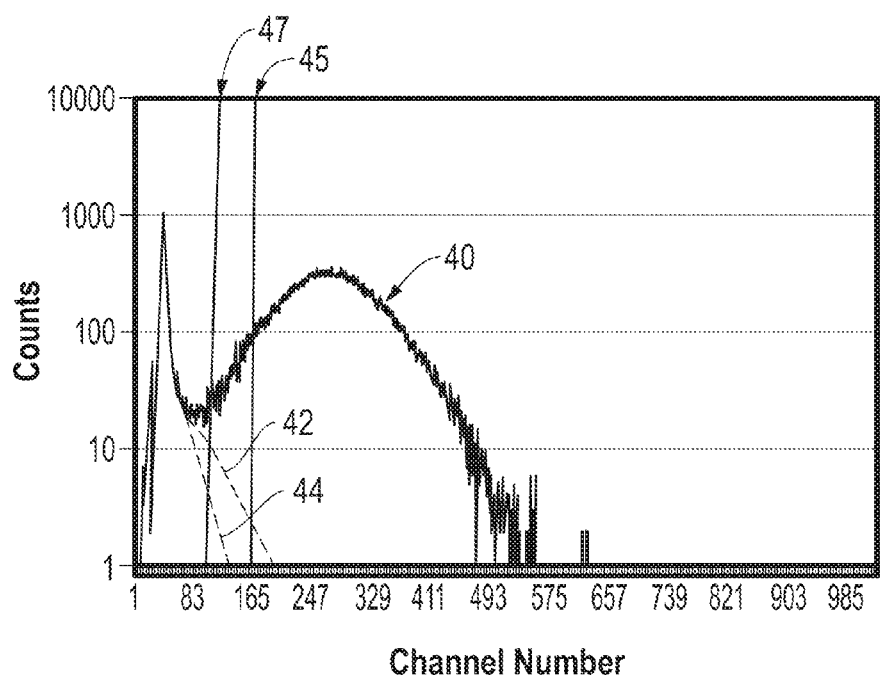
FIG. 4 includes a depiction of pulse shape discrimination spectra for a neutron source when using radiation detection systems with and without a scintillation quencher.

A radiation sensor or a radiation detecting system containing a scintillation quencher can have reduced likelihood of incorrectly identifying gamma radiation as a neutron than a radiation sensor or radiation detector that lacks a scintillation quencher. Referring to FIG. 4, a pulse shape discrimination spectrum illustrates counts as a function of channel number of a multi-channel analyzer for a neutron source, such as $^{241}$AmBe, $^{252}$Cf, $^{239}$PuBe, or the like. In the embodiment corresponding to FIG. 4, when significant gamma radiation is not present, the spectrum 40 for a neutron source has a relatively high, sharp peak at a lower channel number, a relatively broader peak at a higher number, and a valley between the peaks.

In FIG. 4, a couple of dashed lines are illustrated as starting from the near the bottom of the valley, wherein a dashed line 44 corresponds to only gamma radiation received by the radiation detecting system with the scintillation quencher, and a dashed line 42 that corresponds to only gamma radiation received by the radiation detecting system without the scintillation quencher. The dashed line 44 is steeper than the dashed line 42. Thus, the radiation detecting system with the scintillation quencher has significantly lower amounts of gamma radiation at channel numbers greater than the channel number corresponding to the bottom of the valley, as compared to a corresponding radiation detecting system without the scintillation quencher.

The probability of incorrectly identifying gamma radiation as a neutron count is roughly proportional to the area under the curve defined by the dashed line 42 or 44 and to a line corresponding to the channel number of the discrimination setting. Referring to FIG. 4, when the discrimination setting is at about channel number 96 (line 47), the area under the curve for the dashed line 44 is significantly smaller than the area under the curve for the dashed line 42. When the discrimination setting is increased to about channel number 168 (line 45), the area under the curve for the dashed line 44 is below 1 count while the area under the curve for the dashed line 42 remains significant. Thus, the likelihood of incorrectly identifying gamma radiation as a neutron can be reduced by factor at least about 1.5, at least about 2, at least about 5, at least about 11, or even at least about 101 compared to a corresponding radiation detecting system that does not have a scintillation quencher.

The significance of the scintillation quencher may be more apparent when considered in the presence of a significant gamma field and in the context of setting a discrimination level for pulse shape discrimination. A significant gamma field may be about 10 mR/hour, about 20 mR/hour, or another value produced by a gamma radiation source, such as $^{22}$Na, $^{60}$Co, $^{137}$Cs, or the like. In a particular embodiment, a gamma radiation source may be placed at an appropriate distance from the radiation sensor, such that the radiation sensor is exposed to the desired gamma radiation field.

Figure 5:
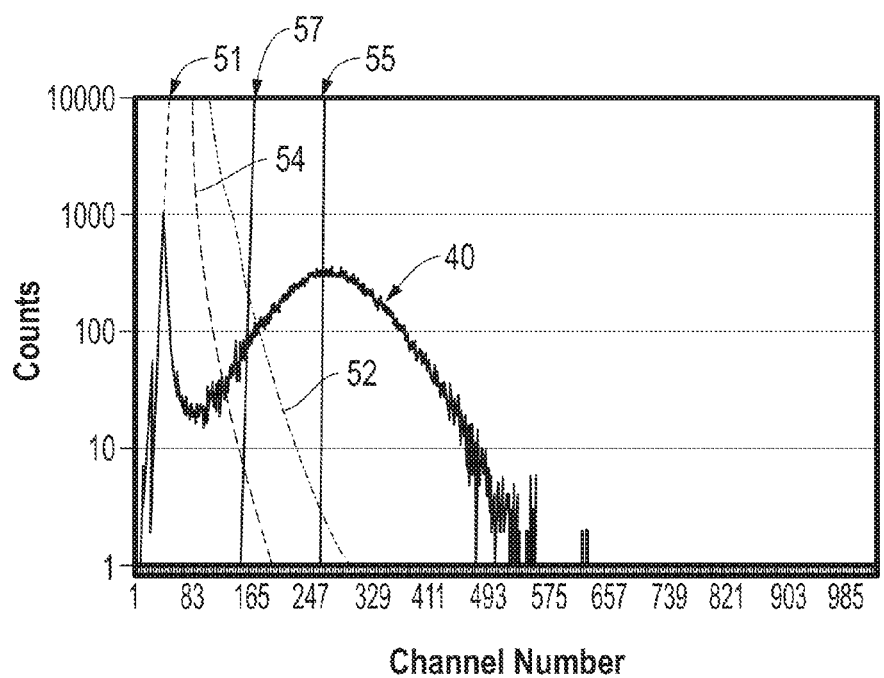
FIG. 5 includes a depiction of pulse shape discrimination spectra for a neutron source with using radiation detecting systems with and without a scintillation quencher, when such radiation detecting systems are exposed to a significant gamma radiation field.

FIG. 5 includes pulse shape discrimination spectra for the neutron source and the gamma radiation source, wherein the radiation sensor is exposed to about 10 mR/hour of gamma radiation. The spectrum 40 corresponds to the neutron source that has been previously described. The spectra for the radiation detecting systems can be different for the significant gamma radiation field. For both radiation detecting systems, the counts rise quickly at low channel numbers, and, thus, the rise for both spectra are illustrated by dashed line 51. At higher channel numbers, the dashed line 54 corresponds to gamma radiation from the gamma radiation source as received by the radiation detecting system with the scintillation quencher, and the dashed line 52 corresponds to gamma radiation from the gamma radiation source received by a corresponding radiation detecting system without the scintillation quencher. Dashed line 54 is steeper than the dashed line 52.

For the radiation detecting system with the scintillation quencher, the discrimination setting may be set to about channel number 161 (line 57 in FIG. 5). When the discrimination setting is at channel number 161, the radiation detecting system can detect neutrons at channel number 161 and higher. If the likelihood of incorrectly detecting gamma radiation as a neutron is not to be increased, the corresponding radiation detecting system without a scintillation quencher may have the discrimination setting increased to about channel number 258 (line 55). When the discrimination setting is at channel number 258, the corresponding radiation detecting system can detect neutrons only at channel number 258 and higher. Note that channel number 258 is close to the channel number corresponding to the highest count for the broader peak of the spectrum 40. Therefore, a substantial portion of spectrum 40 will not be analyzed for neutrons due to an unacceptably high likelihood of incorrectly detecting gamma radiation as a neutron. Unlike the corresponding radiation detecting system, the radiation detecting system with the scintillation quencher can detect neutrons over a substantially larger range of channel numbers. In the embodiment corresponding to FIG. 5, the radiation detecting system with the scintillation quencher can detect neutrons at channel numbers in a range of 161 to 257, which is outside the range for the corresponding radiation detecting system.

As compared to the corresponding radiation detecting system, the radiation detecting system with the scintillation quencher can detect neutrons at lower channel numbers, and at a particular discrimination setting is less likely to incorrectly identify gamma radiation as a neutron. Therefore, the radiation detecting system with the scintillation quencher provides for more accurate neutron detection as compared to the corresponding radiation detecting system at a relatively low gamma radiation field, a relatively high gamma radiation field, or both. Thus, the corresponding radiation detecting system is at least about 1.5, at least about 2, at least about 5, at least about 11, or at least about 101 times more likely to incorrectly identifying gamma radiation as a neutron as compared to the radiation detecting system with the scintillation quencher.

In an embodiment, the optical fiber has a circular cross section having a diameter of at least about 0.5 mm, such as about 0.8 mm, about 1.0 mm, or about 1.5 mm. The diameter of the optical fiber is not greater than about 3 mm, such as about 2.5 mm, or about 2.0 mm. In another embodiment, the optical fiber has a rectangular cross section, with a diagonal length of at least about 0.5 mm, such as about 0.8 mm, about 1.0 mm, or about 1.5 mm. The diagonal length of the optical fiber is not greater than about 3 mm, such as about 2.5 mm, or about 2.0 mm.

Figure 3:
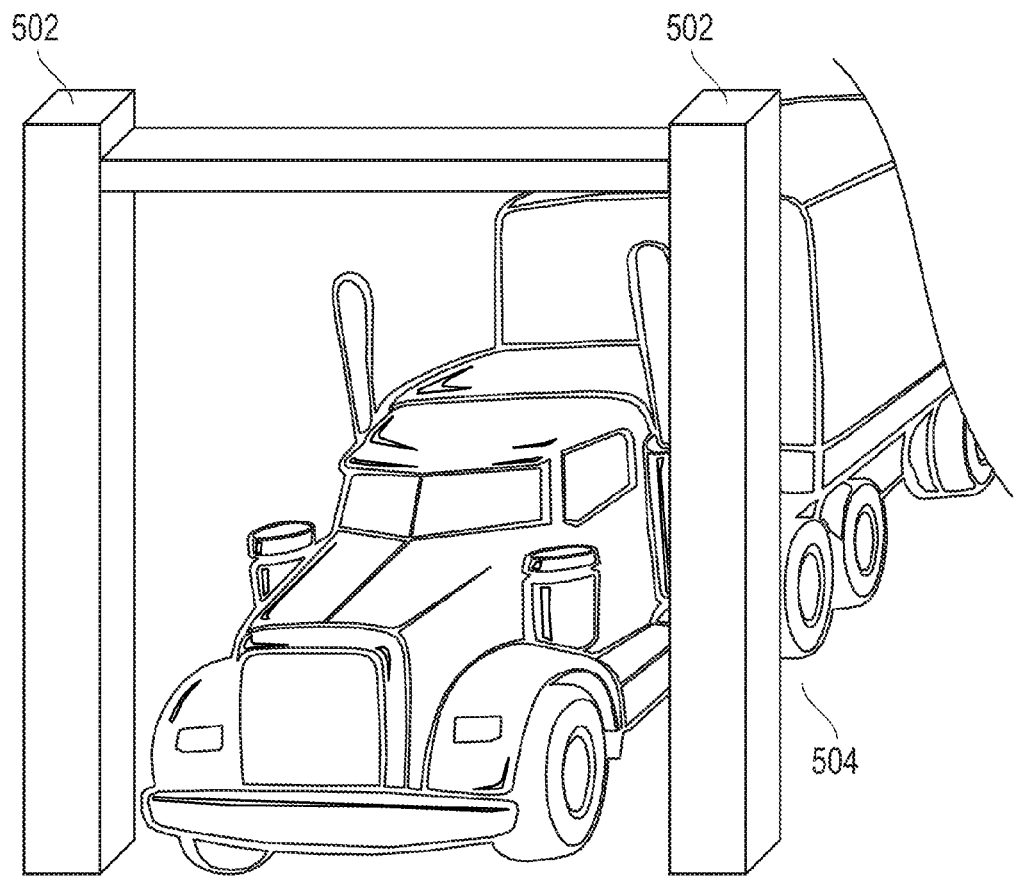
FIG. 3 includes an illustration of an exemplary application using a neutron detector.

The radiation detection apparatus can be a medical imaging apparatus, a well logging apparatus, a security inspection apparatus, or the like. As illustrated in FIG. 3, the radiation detection apparatus 502 can be used as a security inspection apparatus. The radiation detection apparatus 502 can include one or more radiation sensors and photosensor arrangements (not separately illustrated in FIG. 3) as described herein. The radiation sensor(s) can be of any of the previously described radiation sensors. As illustrated in FIG. 3, the radiation sensor(s) may be located within either or both of the vertical columns, the horizontal cross member, or any combination thereof.

When in use, an object 504 can be placed near or pass through an opening within radiation detection apparatus 502. As illustrated in the embodiment of FIG. 3, the object 504 is a vehicle, and in particular, a truck. The radiation detection apparatus 502 can capture at least part of the targeted radiation emitted by the object 504. The radiation sensors can emit scintillating light or wavelength shifted light that is converted to an electronic signal by the photosensors. The electronic signal can be transmitted to a control module (not illustrated) for further analysis.

Other embodiments do not require a dedicated neutron moderator to surround an arrangement of optical fibers. The optical fibers can include a material that is capable of converting fast neutrons to thermal neutrons. When the optical fibers are arranged to an appropriate thickness, fast neutrons can be converted to thermal neutrons and captured by the phosphorescent material. During manufacturing, an operation to place a neutron moderator around the optical fibers is not needed, thus, saving production time and potential yield losses or other defects associated with performing operations that are not required.

Embodiments as described herein can help to reduce radiation other than the neutron capture, such as gamma radiation-caused scintillation, or electron or secondary electron-caused scintillation, both of which can occur in the polymer matrix of the optical fiber. For example, in a neutron detector, scintillation from capturing a neutron contributes to a signal that is desired, whereas scintillation from any other event, for example, gamma radiation or secondary particle, contributes to noise, and the noise may interfere with the detection of or the analysis of the signal. Hence, a higher signal-to-noise ratio can provide more accurate readings. Thus, the radiation sensors and apparatuses as described using the concepts herein provide signal-to-noise ratios than conventional radiation sensors and apparatuses configured to sense and detect neutrons. In particular embodiments, radiation detection apparatuses and components as described herein may be more sensitive to neutrons, less sensitive to gamma radiation, or any combination thereof.

Unlike the radiation detection apparatuses and components as described herein, a high energy particle counter may employ wavelength shifting sheets of polyvinyltoluene that include benzophenone. A high energy particle counter is typically determining the total energy from particles. Thus, high energy particle counters are not concerned with correctly counting neutrons in the presence of gamma radiation and other sources that significantly interfere with correctly counting the neutrons.

Further, the sheet of polyvinyltoluene may have issues with optically coupling to a tube-shaped photosensor, which is commonly used with radiation sensors that are to sense neutrons. If a tube-shaped photosensor would be used, significant signal loss would occur in the transition between the edge of the sheet and the photosensor. Such a configuration may not be able to provide a sufficiently intense signal to the photosensor and cause undercounting of neutrons.

Still further, polyvinyltoluene may not be able to be formed into optical fibers of a size and shape that works well with radiation sensors that are to sense neutrons. For example, a radiation sensor may include many optical fibers that cover a relatively large radiation sensing area, yet outside the radiation sensing area, the optical fibers may include bends and be bundled together, so that the optical fibers are sufficiently optically coupled to a photosensor. Optical fibers made with a polyvinyltoluene core exhibit poorer signal transmission than comparable fibers made with a polystyrene core. Furthermore, it is more difficult to draw polyvinyltoluene fibers as the material tends to bind or clump rather than smoothly transition to a consistent size.

Accordingly, the optical fibers are described herein, particularly when incorporated into a radiation sensor, overcome many of the shortcomings of polyvinyl toluene sheets, and particularly for use of the optical fibers in a neutron sensor. A radiation detection apparatus having a radiation sensor with optical fibers as described herein can have a relatively high signal:noise ratio, and in particular, improved accuracy to detect neutrons even when other radiation, such as gamma radiation, is present. Thus, analysis of the output from the photosensor can provide better discrimination of neutrons from gamma radiation.

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa.

In a first aspect, a radiation sensor can include a scintillator and an optical fiber coupled to the scintillator, wherein the optical fiber includes a scintillation quencher.

In an embodiment of the first aspect, the scintillation quencher includes a UV-absorber. In a particular embodiment, the UV-absorber absorbs radiation at wavelengths in a UV-A range, in a UV-B range, in a UV-C range, or any combination thereof. In a particular embodiment of any of the preceding embodiments, the scintillation quencher absorbs Cherenkov light. In another particular embodiment of any of the preceding embodiments, the scintillation quencher includes a scintillation resistant material. In still another particular embodiment of any of the preceding embodiments, the scintillator is capable of generating a first radiation having a wavelength of at least about 420 nm, and the scintillation quencher is capable of absorbing a second radiation having a wavelength of less than about 420 nm.

In a further particular embodiment of any of the preceding embodiments, the scintillation quencher is selected from the group consisting of aromatic compounds, ketones, and esters. In still a further particular embodiment of any of the preceding embodiments, the scintillation quencher is substantially free of nitrogen. In yet a further particular embodiment of any of the preceding embodiments, the scintillation quencher is selected from the group consisting of benzophenones. In a more particular embodiment, the scintillation quencher is selected from benzophenone, 2,4-dihydroxybenzophenone, 2,2',4,4'-tetrahydroxybenzophenone, 2-hydroxy-4-methoxybenzophenone, 2,2'-dihydroxy-4,4'-dimethoxybenzophenone, 5-chloro-2-hydroxybenzophenone, and 2,2'-dihydroxy-4-methoxybenzophenone. In another particular embodiment of any of the preceding embodiments, the scintillation quencher is present in the optical fiber in an amount of at least about 50 ppm by weight, at least about 129 ppm by weight, at least about 0.01% by weight, at least about 0.05%, of at least about 0.5%, of at least about 1.0%. In still another particular embodiment of any of the preceding embodiments, the scintillation quencher is present in the optical fiber in an amount not greater than about 5.0% by weight, not greater than about 3.0% by weight, not greater than about 0.9% by weight, or not greater than about 0.1% by weight.

In a further particular embodiment of any of the preceding embodiments, the optical fiber further includes a wavelength shifting material. In still a further particular embodiment of any of the preceding embodiments, the optical fiber includes a polymer. In a more particular embodiment, the polymer includes a polystyrene. In still another more particular embodiment, the polymer is substantially free of a polyacrylate. In yet a further particular embodiment of any of the preceding embodiments, the radiation sensor includes a neutron sensor.

In a second aspect, a radiation detecting system can include a scintillator, a photosensor, and an optical fiber coupled between the scintillator and the photosensor. The optical fiber can include a scintillation quencher and operates at a higher signal-to-noise ratio than another optical fiber that does not include any scintillation quencher.

In an embodiment of the second aspect, the photosensor has a sensitivity for radiation in a wavelength between 350 nm and 600 nm. In a particular embodiment, the photosensor has a sensitivity for radiation in a wavelength between 400 nm and 500 nm. In a particular embodiment of any of the preceding embodiments of the second aspect, the scintillation quencher includes a scintillation resistant material. In another particular embodiment of any of the preceding embodiments of the second aspect, the scintillation quencher includes a UV-absorber. In still another particular embodiment of any of the preceding embodiments of the second aspect, the scintillation quencher absorbs radiation at wavelengths in a UV-A range, in a UV-B range, in a UV-C range, or any combination thereof. In yet another particular embodiment of any of the preceding embodiments of the second aspect, the scintillation quencher absorbs Cherenkov light. In a further particular embodiment of any of the preceding embodiments of the second aspect, the scintillator is capable of generating a first radiation having a wavelength of at least about 420 nm, and the scintillation quencher is capable of absorbing a second radiation having a wavelength of less than about 420 nm.

In still a further particular embodiment of any of the preceding embodiments of the second aspect, the scintillation quencher is selected from the group consisting of aromatic compounds, ketones, and esters. In yet a further particular embodiment of any of the preceding embodiments of the second aspect, the scintillation quencher is substantially free of nitrogen. In another particular embodiment of any of the preceding embodiments of the second aspect, the scintillation quencher is selected from the group consisting of benzophenones. In a more particular embodiment of any of the preceding embodiments of the second aspect, the scintillation quencher is selected from benzophenone, 2,4-dihydroxybenzophenone, 2,2',4,4'-tetrahydroxybenzophenone, 2-hydroxy-4-methoxybenzophenone, 2,2'-dihydroxy-4,4'-dimethoxybenzophenone, 5-chloro-2-hydroxybenzophenone, and 2,2'-dihydroxy-4-methoxybenzophenone. In still another particular embodiment of any of the preceding embodiments of the second aspect, the scintillation quencher is present in the optical fiber in an amount of at least about 50 ppm by weight, at least about 129 ppm by weight, at least about 0.01% by weight, at least about 0.05%, of at least about 0.5%, or at least about 1.0%. In yet another particular embodiment of any of the preceding embodiments of the second aspect, the scintillation quencher is present in the optical fiber in an amount not greater than about 5.0% by weight, not greater than about 3.0% by weight, not greater than about 0.9% by weight, or not greater than about 0.1% by weight.

In a particular embodiment of any of the preceding embodiments of the second aspect, the optical fiber further includes a wavelength shifting material. In another particular embodiment of any of the preceding embodiments of the second aspect, the optical fiber includes of a polymer. In still another particular embodiment of any of the preceding embodiments of the second aspect, the polymer includes a polystyrene. In a more particular embodiment, the polymer is substantially free of a polyacrylate. In yet another particular embodiment of any of the preceding embodiments of the second aspect, the radiation sensor includes a neutron sensor.

In a third aspect, an optical fiber can include a polymer core, and a scintillation quencher.

In an embodiment of the third aspect, the optical fiber further includes a wavelength shifting material. In a particular embodiment of any of the preceding embodiments of the third aspect, the polymer core includes a polystyrene. In another particular embodiment of any of the preceding embodiments of the third aspect, the scintillation quencher includes a UV-absorber. In a more particular embodiment, the UV-absorber absorbs radiation at wavelengths in a UV-A range, in a UV-B range, in a UV-C range, or any combination thereof. In still another particular embodiment of any of the preceding embodiments of the third aspect, the scintillation quencher absorbs Cherenkov light. In yet another particular embodiment of any of the preceding embodiments of the third aspect, the scintillation quencher includes a scintillation resistant material. In a further particular embodiment of any of the preceding embodiments of the third aspect, the optical fiber is capable of transmitting a first radiation having a wavelength of at least about 420 nm, and the scintillation quencher is capable of absorbing a second radiation having a wavelength of less than about 420 nm.

In still a further particular embodiment of any of the preceding embodiments of the third aspect, the scintillation quencher is selected from the group consisting of aromatic compounds, ketones, and esters. In yet a further particular embodiment of any of the preceding embodiments of the third aspect, the scintillation quencher is substantially free of nitrogen. In a particular embodiment of any of the preceding embodiments of the third aspect, the scintillation quencher is selected from the group consisting of benzophenones. In a more particular embodiment, the scintillation quencher is selected from benzophenone, 2,4-dihydroxybenzophenone, 2,2',4,4'-tetrahydroxybenzophenone, 2-hydroxy-4-methoxybenzophenone, 2,2'-dihydroxy-4,4'-dimethoxybenzophenone, 5-chloro-2-hydroxybenzophenone, and 2,2'-dihydroxy-4-methoxybenzophenone. In another particular embodiment of any of the preceding embodiments of the third aspect, the scintillation quencher is present in the optical fiber in an amount of at least about 50 ppm by weight, at least about 129 ppm by weight, at least about 0.01% by weight, at least about 0.05%, of at least about 0.5%, of at least about 1.0%. In still another particular embodiment of any of the preceding embodiments of the third aspect, the scintillation quencher is present in the optical fiber in an amount not greater than about 5.0% by weight, not greater than about 3.0% by weight, not greater than about 0.9% by weight, or not great than about 0.1% by weight.

In a further particular embodiment of any of the preceding embodiments of the third aspect, the optical fiber has a circular cross section with a diameter of at least about 0.5 mm, at least about 0.8 mm, or at least about 1.0 mm. In another further particular embodiment of any of the preceding embodiments of the third aspect, the optical fiber has a circular cross section with a diameter not greater than about 3.0 mm, not greater than about 2.5 mm, or not greater than about 2.0 mm. In yet another particular embodiment of any of nearly all of the preceding embodiments of the third aspect, the optical fiber has a rectangular cross section with a diagonal length of at least about 0.5 mm, at least about 0.8 mm, or at least about 1.0 mm. In still another particular embodiment of any of nearly all of the preceding embodiments of the third aspect, the optical fiber has a rectangular cross section with a diagonal length not greater than about 3.0 mm, not greater than about 2.5 mm, or not greater than about 2.0 mm.

In a fourth aspect, a method to detect a neutron can include providing a scintillator coupled to an optical fiber, wherein the optical fiber includes a scintillation quencher. The method can also include emitting a first radiation in the scintillator and transmitting the first radiation along the optical fiber. The method can further include quenching a second radiation in the optical fiber, wherein the first radiation is different from the second radiation.

In an embodiment of the fourth aspect, the method further includes receiving at a photosensor the first radiation or a derivative of the first radiation, wherein a radiation detecting system includes the scintillator, the optical fiber, and the photosensor. In a particular embodiment, a signal-to-noise ratio with the radiation detecting system is higher than a signal-to-noise ratio with a corresponding radiation detecting system without the scintillation quencher.

In another particular embodiment of any of the preceding embodiments of the fourth aspect, the second radiation is Cherenkov light. In still another particular embodiment of any of the preceding embodiments of the fourth aspect, the first radiation has a wavelength of at least about 420 nm. In yet another particular embodiment of any of the preceding embodiments of the fourth aspect, the method further includes quenching a third radiation, wherein the third radiation is scintillation light generated in the optical fiber. In a further particular embodiment of any of the preceding embodiments of the fourth aspect, the method further includes quenching a fourth radiation, wherein the fourth radiation is light passing along the optical fiber, the light having a wavelength of less than 420 nm. In another further particular embodiment of any of the preceding embodiments of the fourth aspect, a corresponding radiation detecting system without the scintillation quencher is at least about 1.5, at least about 2, at least about 5, at least about 11, or at least about 101 times more likely to incorrectly identifying gamma radiation as a neutron as compared to the radiation detecting system with the scintillation quencher. In a more particular embodiment, the method can include exposing the radiation detecting system with the scintillation quencher and the corresponding radiation detecting system to a gamma radiation field of at least about 10 mR/hour or at least about 20 mR/hour.

In still another further particular embodiment of any of the preceding embodiments of the fourth aspect, the scintillation quencher is selected from the group consisting of aromatic compounds, ketones, and esters. In yet another further particular embodiment of any of the preceding embodiments of the fourth aspect, the scintillation quencher is substantially free of nitrogen. In a particular embodiment of any of the preceding embodiments of the fourth aspect, the scintillation quencher is selected from the group consisting of benzophenones. In a more particular embodiment, the scintillation quencher is selected from benzophenone, 2,4-dihydroxybenzophenone, 2,2',4,4'-tetrahydroxybenzophenone, 2-hydroxy-4-methoxybenzophenone, 2,2'-dihydroxy-4,4'-dimethoxybenzophenone, 5-chloro-2-hydroxybenzophenone, and 2,2'-dihydroxy-4-methoxybenzophenone. In another particular embodiment of any of the preceding embodiments of the fourth aspect, the method further includes shifting the first radiation to a higher wavelength to form a derivative of the first radiation along the optical fiber.

The radiation sensor, the radiation detecting system, or the method of any one of the preceding claims, wherein optical fibers are wavelength shifting fibers that include polystyrene, and the scintillation quencher or scintillation resistant material includes benzophenone.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. An optical fiber, comprising:
   a polymer core;
   a wavelength-shifting material; and
   a scintillation quencher including a UV-absorber, wherein the scintillation quencher is selected from a group consisting of benzophenone, 2,4-dihydroxybenzophenone, 2,2',4,4'-tetrahydroxybenzophenone, 2-hydroxy-4-methoxybenzophenone, 2,2'-dihydroxy-4,4'-dimethoxybenzophenone, 5-chloro-2-hydroxybenzophenone, 2,2'-dihydroxy-4-methoxybenzophenone, or a combination thereof.

2. The optical fiber according to claim 1, wherein the polymer core comprises a polystyrene.

3. The optical fiber according to claim 1, wherein the optical fiber comprises a cladding.

4. The optical fiber according to claim 1, wherein the UV-absorber absorbs radiation at wavelengths in a UV-A range, in a UV-B range, in a UV-C range, or any combination thereof.

5. The optical fiber according to claim 1, wherein the scintillation quencher absorbs Cherenkov light.

6. The optical fiber according to claim 1, wherein the scintillation quencher includes a scintillation resistant material.

7. The optical fiber according to claim 1, wherein:
   the optical fiber is capable of transmitting a first radiation having a wavelength of at least about 420 nm; and
   the scintillation quencher is capable of absorbing a second radiation having a wavelength of less than about 420 nm.

8. The optical fiber according to claim 1, wherein the scintillation quencher is in an amount of at least about 50 ppm by weight and no greater than about 10.0% by weight.

9. The optical fiber according to claim 1, wherein the optical fiber has a circular cross section with a diameter of at least about 0.5 mm to not greater than about 3.0 mm.

10. The optical fiber according to claim 1, wherein the optical fiber has a rectangular cross section with a diagonal length of at least about 0.5 mm to not greater than about 3.0 mm.

11. A radiation sensor, comprising:
    a scintillator; and
    the optical fiber according to claim 1,
    wherein the optical fiber is coupled to the scintillator.

12. The radiation sensor according to claim 11, wherein the scintillator is capable of generating a first radiation having a first wavelength of at least about 420 nm, and the scintillator quencher is capable of absorbing a second wavelength of less than about 420 nm.

13. A radiation detecting system, comprising:
    a scintillator;
    a photosensor; and
    the optical fiber according to claim 1,
    wherein the optical fiber is coupled between the scintillator and the photosensor.

14. An optical fiber, comprising:
    a polymer core; and
    a scintillation quencher in an amount of at least about 50 ppm by weight and no greater than about 10.0% by weight.

15. The optical fiber according to claim 14, wherein the scintillation quencher includes a scintillation resistant material.

16. The optical fiber according to claim 14, wherein the scintillation quencher is substantially free of nitrogen.

17. The optical fiber according to claim 14, wherein the scintillation quencher is selected from a group consisting of benzophenones.

18. The optical fiber according to claim 14, further comprising a wavelength shifting material.

19. The optical fiber according to claimed 14, wherein the scintillation quencher comprises a UV-absorber.

20. The optical fiber according to claimed 19, wherein the UV-absorber absorbs radiation at wavelengths in a UV-A range, in a UV-B range, in a UV-C range, or any combination thereof.

* * * * *